United States Patent [19]
Chliwnyj et al.

[11] Patent Number: 5,394,280
[45] Date of Patent: Feb. 28, 1995

[54] DETECTING A SERVO ERROR ON A MAGNETIC TAPE AND IDENTIFYING EXTENT AND LOCATION OF THE DETECTED SERVO ERROR BY LINKED CONTROL MARKS

[75] Inventors: Alex Chliwnyj; David C. Graves; Scott M. Fry; Pamela R. Nylander-Hill; Habib M. Torab; Will A. Wright, all of Tucson, Ariz.

[73] Assignee: International Business Machines Corporation, Armonk, N.Y.

[21] Appl. No.: 75,622

[22] Filed: Jun. 14, 1993

[51] Int. Cl.⁶ .................... G11B 5/584; G11B 5/09; G11B 5/596
[52] U.S. Cl. .................... 360/77.12; 360/53; 360/48; 360/78.08
[58] Field of Search ............... 360/77.12, 78.04, 77.04, 360/53, 48, 77.02, 78.08, 78.11, 60

[56] References Cited

U.S. PATENT DOCUMENTS

| | | | |
|---|---|---|---|
| 3,997,876 | 12/1976 | Frush | 360/27 X |
| 4,214,280 | 7/1980 | Halfhill et al. | 360/53 |
| 5,200,864 | 4/1993 | Dunn et al. | 360/48 |
| 5,262,908 | 11/1993 | Iwamatsu et al. | 360/77.12 |

FOREIGN PATENT DOCUMENTS 3206958 8/1988 Japan .

*Primary Examiner*—Aristotelis Psitos
*Assistant Examiner*—Varsha A. Kapadia
*Attorney, Agent, or Firm*—H. F. Somermeyer; M. W. Schecter

[57] ABSTRACT

A magnetic tape drive simultaneously senses on a magnetic tape three evenly spaced-apart servo track areas for servoing a multi-track magnetic head to follow a concurrent set of data tracks on the magnetic tape. The data tracks are arranged into a plurality of track groups. Each track group has a first and second subgroup of data tracks. The first subgroup of tracks are scanned in a first relative motion of the magnetic tape and magnetic head as a forward direction (tape is being spooled from a supply tape reel). The second subgroup of tracks are scanned in a second relative motion of the magnetic tape and magnetic head that is opposite in direction to the first relative direction and is a forward direction of scanning. While writing data in any one of the plural track groups, a servo dropout affecting most of the servo track areas is detected and indicated as a servo error. Writing is aborted. The relative position of the magnetic tape and head is detected at both longitudinal ends of the servo dropout. A servo dropout block (SDB), a tape control block, is written at each longitudinal end of the servo dropout only in the group of tracks in which data are being written. The tape space between the two SDBs is termed a limited portion of the tape in which no recording is permitted.

12 Claims, 12 Drawing Sheets

DETECTING A SERVO ERROR ON A MAGNETIC TAPE AND IDENTIFYING EXTENT AND LOCATION OF THE DETECTED SERVO ERROR BY LINKED CONTROL MARKS

FIELD OF THE INVENTION

The present invention relates to recording systems, particularly to those recording systems using media that are subject to media defects and for identifying said media defects with linked defect indicating marks.

BACKGROUND OF THE INVENTION

Magnetic tape media having a so-called serpentine track format and high track densities employ track-following servo systems for ensuring faithful track to head gap registration laterally along elongated data tracks. It is well known that tape media are subject to media defects at which no data can be successfully recorded. For ensuring that the head gap to data track registration is maintained, it is important that the servo tracks be successfully read. If certain read errors occur while reading the servo tracks, then, to avoid unintended overwriting data recorded on adjacent tracks, writing data onto data tracks must be aborted as soon as such servo read errors are detected. It is desired that such servo track defects be identified on the media such that later recording in the same area of the tape can be controlled to avoid recording data adjacent to said servo track defect. This defect avoidance, eliminates unintended reading invalid (old) data that now, because of an adjacent servo error, can never be overwritten. Storing such data in an error log saves such error data for later avoiding unintended writing and reading.

When encountering such defects in a servo area of the medium, a choice is made to "cross out" the defect from the medium such that data processing (recording and reading) may be temporarily suspended while scanning in a lateral alignment to such detected defective servo tracks. In NRZI 9-track recording, a so-called erase gap was created that extended over track defects. Such an erase gap appeared as an elongated inter-block gap (IBG). This prior art error indication is useful only if one could still write the data obliterated by a media defect. Therefore, in servo track controlled writing wherein writing may not be an available error recovery, it is desired to provide a more reliable indication of tape media defects. All blocks of data recorded on tape are addressable by a block ID and by a tachometer count value.

SUMMARY OF THE INVENTION

First and second tape control marks are recorded in a set of data tracks on a record medium for indicating a limited portion of the record medium. Data recording ensues in a usual sense immediately following the second tape control mark. The tape marks have pointers to each other for indicating a physical location of the tape marks in the set of data tracks. At either longitudinal end of a magnetic tape, only one tape control mark is recorded that indicates tape recording is to ensue on a different set of data tracks on the tape. In one aspect of the invention, in a magnetic tape having lateral track indicating servo tracks, the limited portion is created to be coextensive with servo defect areas. Access to data tracks in the limited area is prohibited. In a magnetic tape having plural groups of interleaved data tracks, the prohibition can be limited to a group of data tracks that detected the servo defect during a recording operation in such group of tracks, however, extensive media defects prevent writing in any track group. A record of the detected servo track is added to a control area at a logical beginning of the tape. The tape control marks are recorded using the same addressable block format as addressable user data blocks.

The foregoing and other objects, features and advantages of the invention will be apparent from the following more particular description of preferred embodiments of the invention, as illustrated in the accompanying drawings.

DETAILED DESCRIPTION

Figure 1:
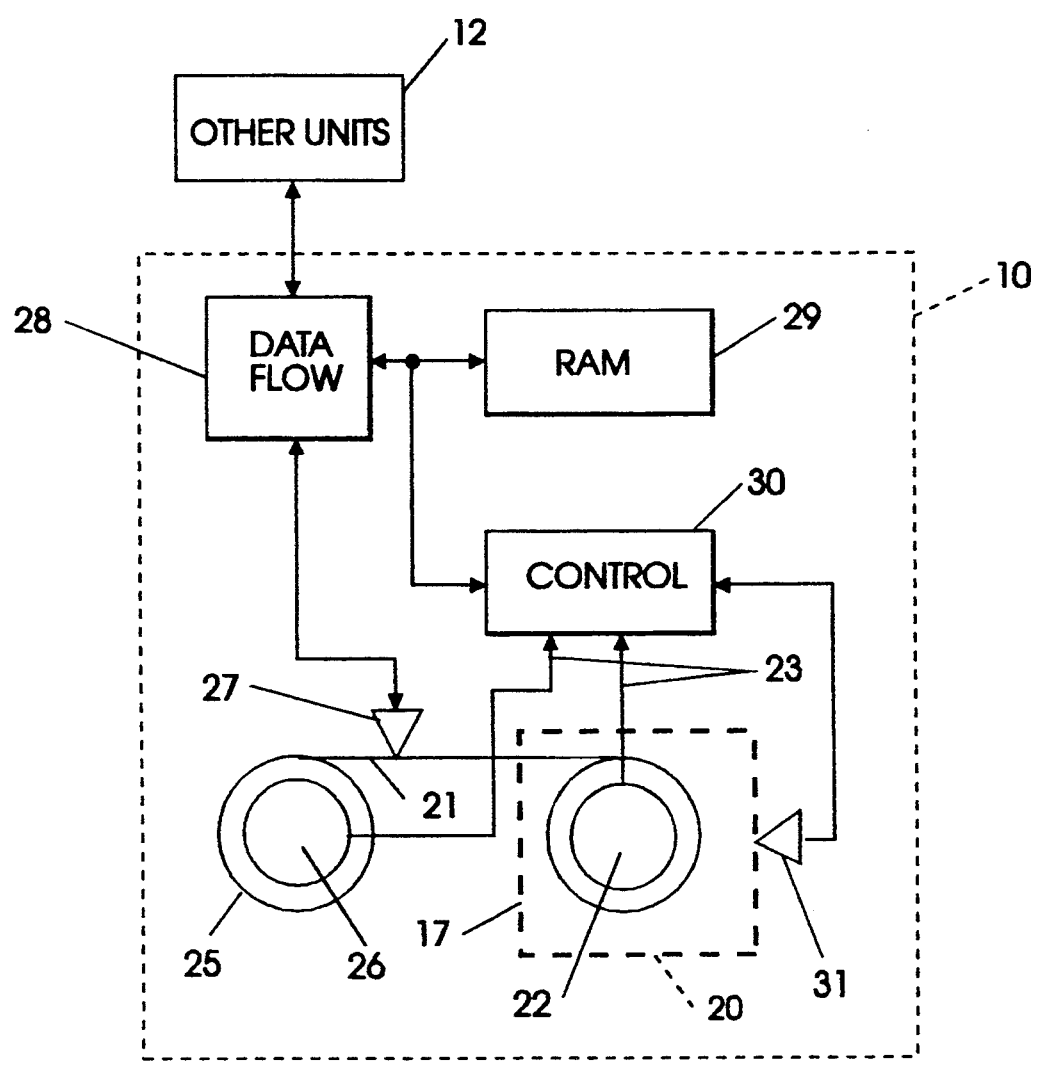
FIG. 1 illustrates in simplified block diagram form a data storage system that employs the present invention.
Figure 2:
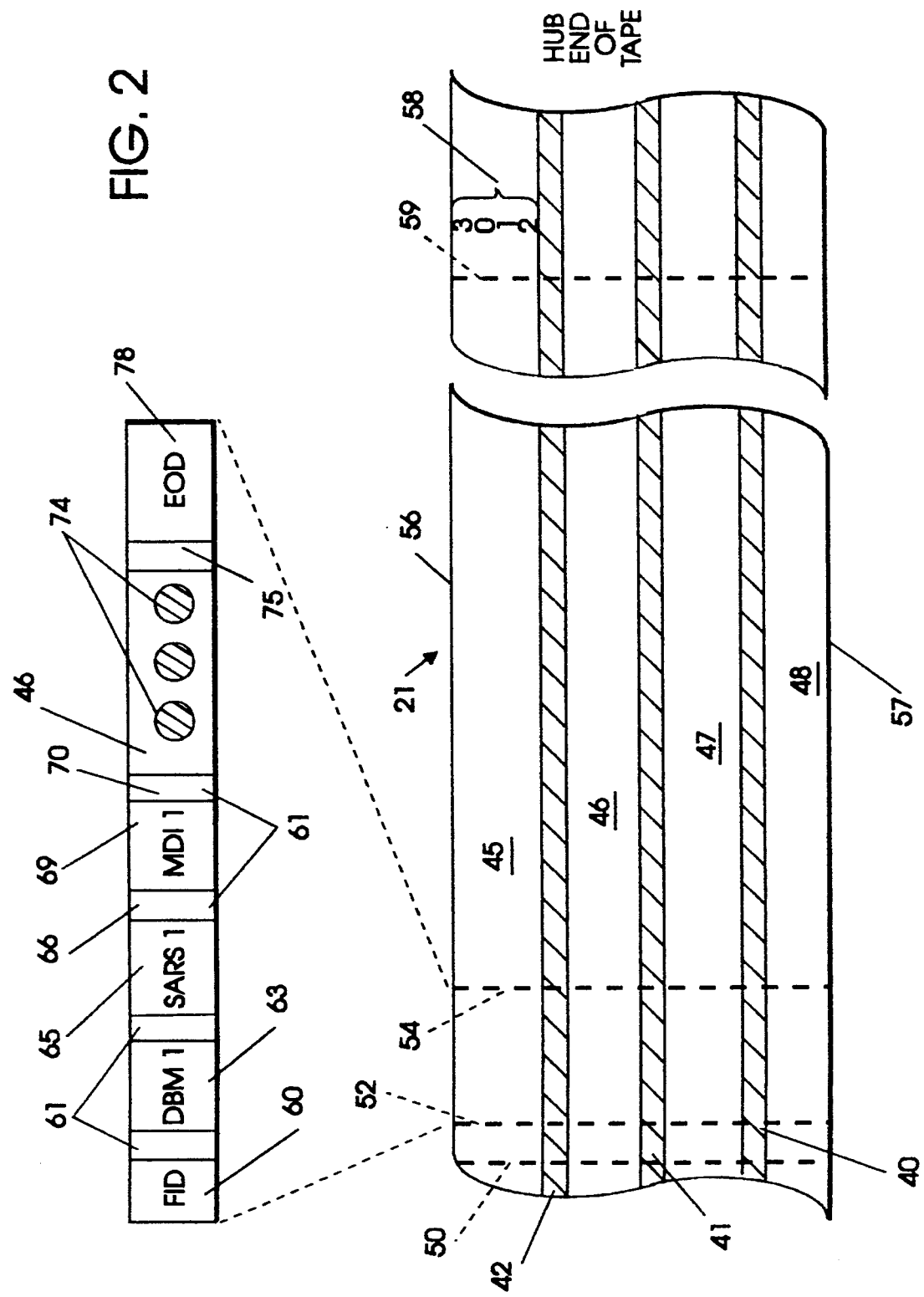
FIG. 2 is a diagrammatic showing of a magnetic tape format with which the present invention is advantageously employed.

Referring now more particularly to the appended drawing, like numerals indicate like parts and structural features in the various figures. Referring first to FIG. 1, tape drive 10 is connected (attached) to other units 12. Other units 12 represent peripheral controllers, computers of all types, communication systems, local networks and the like. In a constructed embodiment, tape cartridge or cassette 17 containing a single spool 20 of magnetic tape 21 is removably inserted into tape drive 10. Tape cartridge 17 shown in a play position operatively connects a spool motor and tachometer 22 to tape spool 20 for unreeling and reeling tape 21. Tape 21 is automatically threaded (in a known manner) past laterally-positionable multi-track multi-gap head 27 to machine reel 25. Data are transferred between tape 21 and other units 12 via data flow 28. Data flow 28 performs the usual formatting, error detecting and correcting, and other processing of information-bearing signals (data) found in magnetic tape recording apparatus. Motor and tachometer 26 rotate spool 25 in synchronism with spool 20, as is known. Lines 23 denote control and sensing signal transfer between motors 22 and 26 with tape device control 30. Control 30 includes the usual programmed control for controlling data flow 28 and communicating with other units 12. Cartridge present sensor 31 senses the cartridge 17 for informing control 30 that cartridge 17 has been loaded into tape drive 10.

Referring next to FIGS. 2 through 6, the tape format, one head gap arrangement and servo control are described. Tape 21 includes triple longitudinally-extending laterally-spaced-apart redundant servo areas 40-42. At a free end of tape 21 (at dashed line 50), a drive-to-tape calibration area is disposed between dashed lines 50 and 52. This area contains signals (not described) that enable tape drive 10 to calibrate its operation to the particular characteristics of the loaded tape 21. The tape area between dashed line 52 and a hub end of tape 21, indicated by dashed line 59, is available for recording as will become apparent. Numeral 58 denotes the four track groups 0-3 used in the constructed embodiment. Serial recording proceeds from track group 0 through track group 3, no limitation thereto intended. The first track group 0 is laterally displaced from longitudinal edges 56 and 57 respectively by tracks in track groups 3 and 1,2. Since track group 0 is a logical beginning of data recording, control information useful to either other units 12 or tape drive 10 may be first recorded in track group 0. Tape drive 10 has the usual load point controls for positioning magnetic tape and magnetic head 27 to first read the tracks in track group 0.

Since track group 0 is a logical beginning of data recording, tape control information (data base map DBM 63 and statistical analysis recording system SARS 65) is recorded in track group 0 in a so-called drive partition that exists between dashed lines 52 and dashed line 54 only in the track group 0. Such drive partition in track group 0 is only addressable by tape drive 10 and not by controller 11 nor other units 12. All other units addressable partitions on tape 21 are numbered from 0 to a current maximum number of partitions while the drive partition is not so numbered. The drive partition is addressed by moving tape 21 to its so-called load point, as at FID 60. Each partition, whether a drive partition or an addressable partition, is a logical collection of contiguous sectors, each partition may have a different number of sectors. A sector (sometimes referred to as a segment) is a tachometer 22 determined length of tape and can be accessed by moving tape 21 and monitoring tachometer 22 generated count values (not shown). First dashed line 54 does not apply to data tracks in track groups 1-3. Milligan et al in U.S. Pat. No. 4,393,883 shows generating physical reference values (PRV) that are usable to identify the sectors on tape 21.

Control information stored in the drive partition is useful to other units 12 or tape drive 10 but such control information is addressable and readable only by peripheral drive 10. Tape drive 10 may supply such information to either controller or other units 12, as may be desired. The control information stored in the drive partition is that information primarily useful to tape drive 10 as it identifies physical locations on tape 21 of diverse control data elements useful for quickly locating data stored on tape 21, therefore it is referred to as storage medium physical access data. The usual prior art VTOC or TTOC may be stored in partition 0 for identifying to other units 12 the informational content of tape 21 including the logical data elements as partitions, logical volumes, files and the like. Control information shown in FIG. 2 identified by numerals 60-78, in the drive partition is not visible (addressable) outside of tape drive 10. The illustrated drive partition may consist of a plurality of partitions, for example, a DBM partition for storing all copies of DBM, a SARS partition for storing all copies of SARS and an MDI partition for storing all copies of MDI. All other partitions are addressable, explicitly or implicitly by other units 12. Implicit addressing is by other units 12 addressing files, virtual volumes and the like. Tape drive 10 has the usual load point controls for positioning magnetic tape and magnetic head 27 to first read the tracks in track group 0.

Control information in tape drive 10 created, updated and managed partition that is temporarily stored in RAM 29 as next described. First, on tape 21 i format identification FID block 60 (FIG. 2) indicates that tape 21 is formatted as shown. All other tape control information is stored in K copies, K is an integer preferably $2^J$ where J is a positive integer, such as 3. Each block of control information is separated by a usual interblock gap (IBG) 61. A first copy of the control information includes DBM 1 (copy 1 of K) in area 63, SARS 1 (copy 1 of K) in area 65 and mount-demount indicator MDI 1 in area 69. All additional copies of the control information are represented by ellipsis 74. An end-of-data EOD tape control block 78 indicates the end of data in the tape drive accessed partition indicated by numeral 75. Alternately, all MDI copies may be stored in one string of blocks, all DBM copies stored in a second string of blocks and all SARS copies stored in a third string of blocks. The sequence of storage in the drive partition is one of choice.

Figure 3:
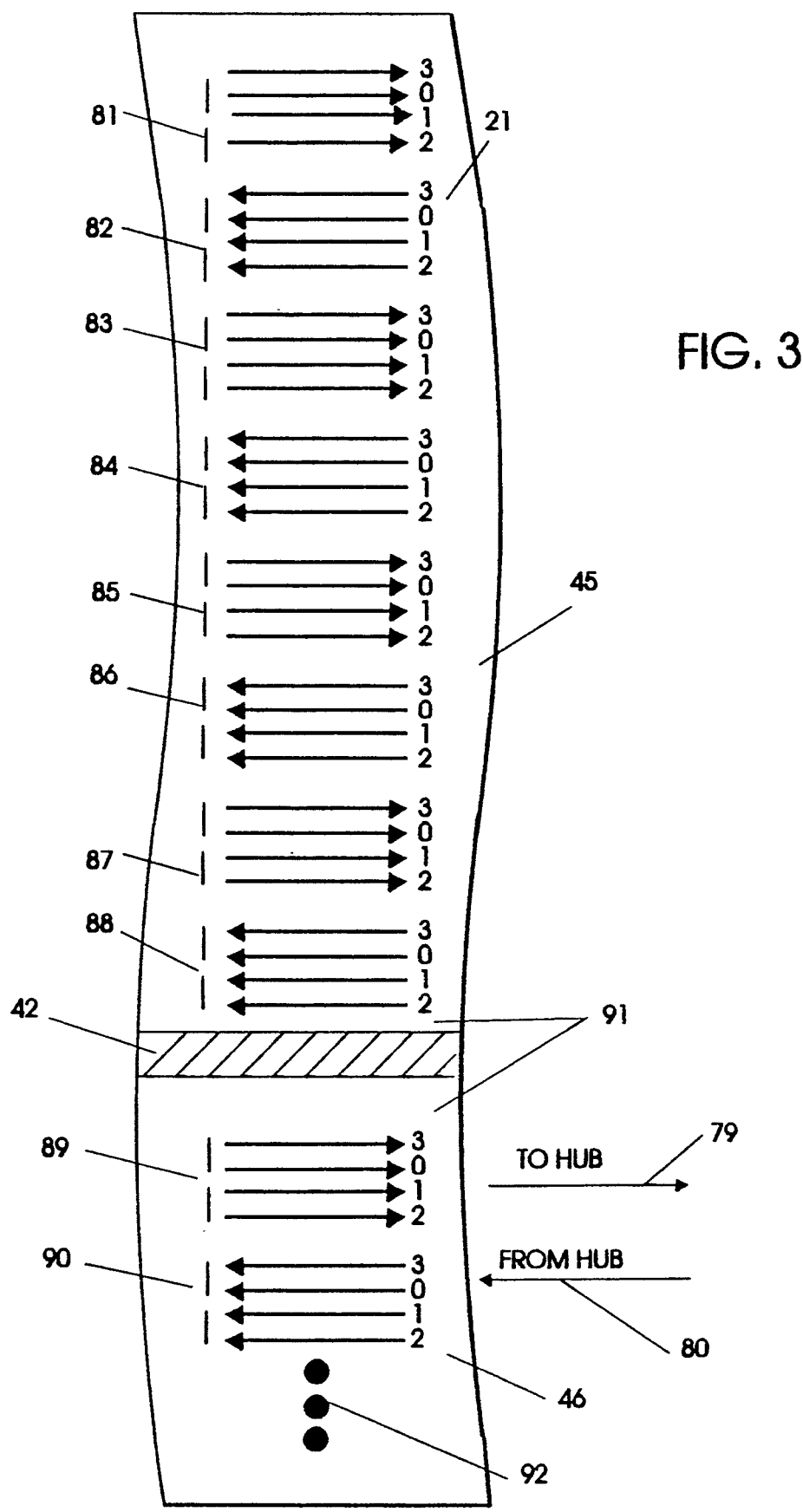
FIG. 3 is a diagrammatic showing of serpentine track accessing for the FIG. 2 illustrated magnetic tape.

FIG. 3 diagrammatically illustrates obtaining a maximal spacing between adjacent tracks in each track group 0-3. Numerals 81-90 respectively indicate track clusters 1-10, each track cluster having one track from each track group. Laterally adjacent track clusters have tracks scanned in opposite scanning directions 79 and 80. Magnetic tape 21 moves in a direction opposite to the track scanning direction by magnetic head 27. The "to hub" scanning direction is caused by magnetic tape 21 being reeled from cartridge spool 20 while the "from hub" scanning direction is caused by magnetic tape being reeled onto cartridge spool 20. Magnetic tape is scanned in a serpentine sequence. While magnetic head 27 is at one lateral (index) position, one serpentine scan (also termed a track wrap) occurs. In scan direction 79 one track in each of the odd numbered clusters are scanned while in scan direction 80 one track in each of the even numbered track clusters are scanned. The arrows in the respective track clusters 81-90 (respectively indicating clusters 1-10) indicate the tracks. Each vertical number sequence "2 0 1 3" in each of the track clusters respectively indicate the track group to which the respective track belongs. The track number of the arrow indicated tracks in each of the clusters is determined by the following equations wherein K is the cluster number from 1-32:

*Track number of track group 2 track* $= (K*4) - 3$     (1)

*Track number of track group 0 track* $= (K*4) - 2$     (2)

*Track number of track group 1 track* $= (K*4) - 1$     (3)

*Track number of track group 3 track* $= (K*4)$     (4)

All of the tracks are evenly spaced apart laterally. The concurrently accessed tracks of each track group are spaced apart by seven intervening tracks. For example, tracks 1 and 9, as determined by the equations above, are laterally separated by tracks 2 through 8. For having four groups of tracks, such lateral spacing is maximum for all tracks and is the same for all successively numbered tracks in each track group. Note that the tracks of track group 2 in the even numbered track clusters are not accessed concurrently to the track group 2 tracks in odd numbered clusters. Also, the four data track areas 45-48 (FIGS. 2 and 4) have a like number of tracks (each data track area having eight track clusters) such that the servo track areas 4042 have a maximum lateral spacing. Such maximum lateral spacing is an optimum spacing for facilitating and enhancing correction of data errors caused by magnetic tape defects.

A pair of unrecorded longitudinally-extending guard bands 91 separate the data track areas 45-48 from each of the servo track areas 40-42.

Figure 4:
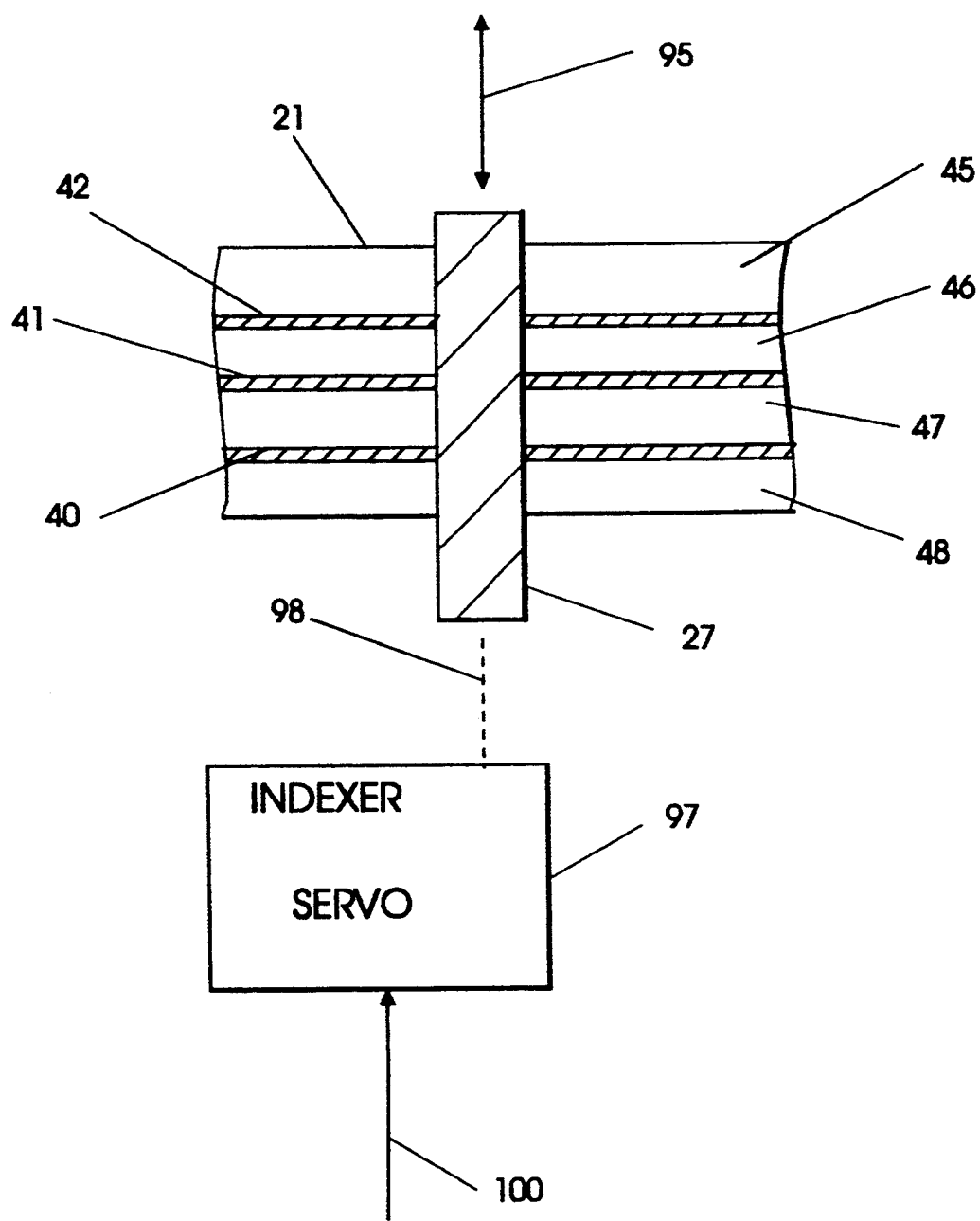
FIG. 4 is a simplified schematic of head indexing for the FIG. 1 illustrated system using the FIG. 2 illustrated magnetic tape.
Figure 5:
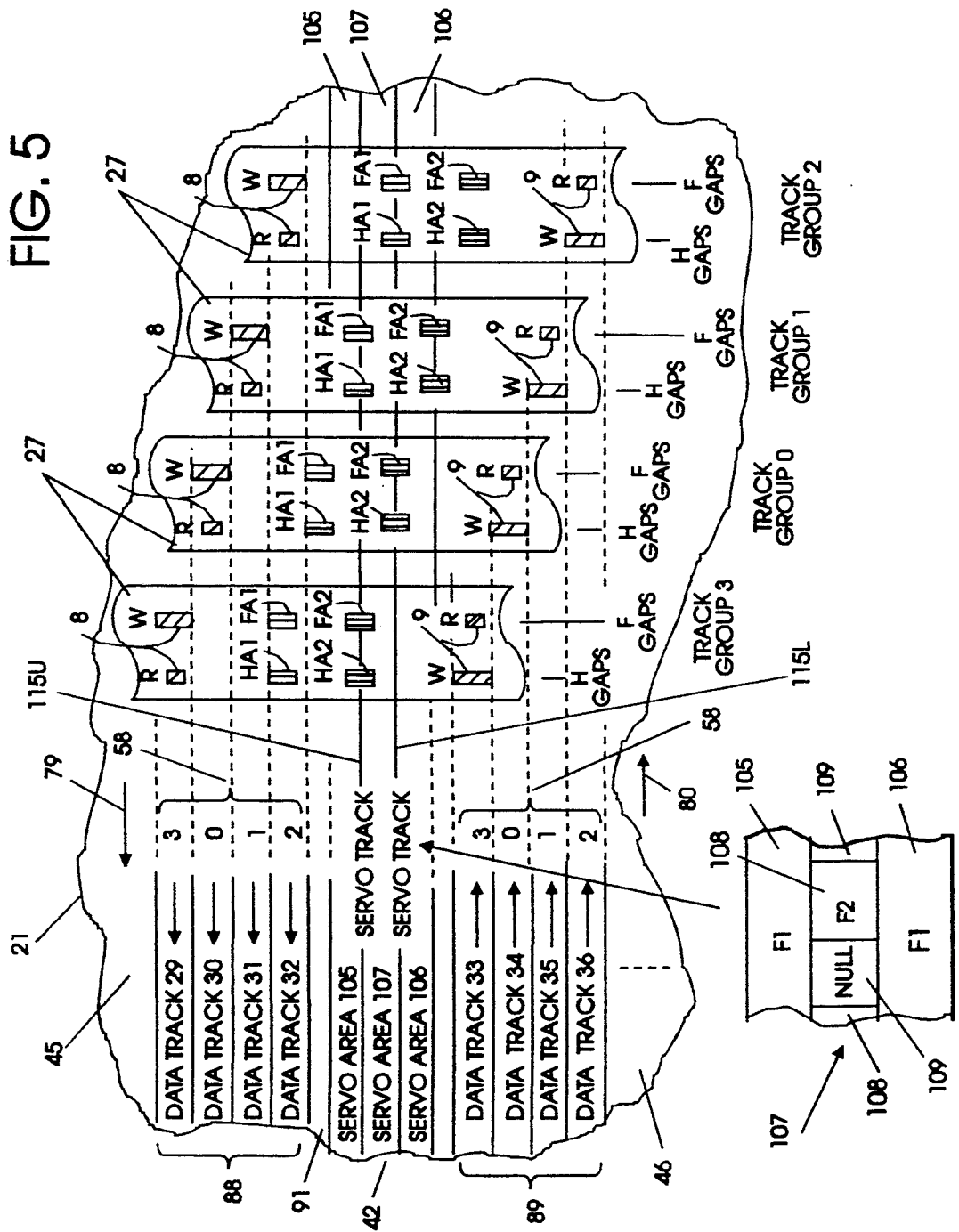
FIG. 5 illustrates a four servo position for selecting one of four groups of tracks to be accessed in the FIG. 2 illustrated tape.

FIG. 4 shows indexing head 27 (head is detailed in FIG. 6) laterally of magnetic tape 21. Magnetic head 27 has three sets of servo gaps A, B and C that concurrently sense the respective servo track areas 40-42, respectively. The sensed servo signals are processed in a usual manner to generate a servo drive signal on line 100 for actuating servo 97 to move head 27 to follow the servo tracks. Numeral 98 indicates the physical connection of servo 97 to head 27. Also included in servo 97 is an electronic circuit (not shown) that initially indexes head 27 to position the servo gaps over the respective servo track areas as best seen in FIG. 5.

Returning to FIG. 5, remember that servo track areas 40-42 are identical. Servo track area 42 between data track areas 45 and 46 is detailed. Between guard bands 91 two longitudinally-extending frequency-F1 baseband tone areas 105 and 106 extend substantially the length of tape 21. A longitudinally-extending modulated servo area 107 is interleaved between tone areas 105 and 106. Area 107 has alternating sections 108 of frequency-F2 tone with sections 109 of null (all 0's signal in a data format, such as in a 1,7 d,k code) signal. F1 and F2 have a predetermined different frequency for effecting lateral position indication at the boundaries (servo tracks) 115 and 116 between the F1 and F2 frequency. The null sections 109 enable checking centering of an active servo gap scanning the respective servo tracks 115 and 116. The servo positioning action will be describe with respect to FIG. 5 after the FIG. 6 illustrated head gap arrangement is next described.

Magnetic head 27 has two portions F and H with interleaved write and read gaps. U.S. Pat. No. 5,161,299 (patent '299) shows an multi-gap multi-track head that does not have servo gaps. The head used in this invention is an improvement over the magnetic head shown in said patent '299. All of the odd numbered write gaps W in section H write data in scanning direction 80 while the even-numbered write gaps W in section F write data in scanning direction 79. The read after write verification is respectively effected by the odd-numbered and even-numbered read gaps R in the scanning directions 79 and 80. During read operations, read gaps R also read data from magnetic tape 21. Magnetic head 27 has 32 write gaps (16 in each head section) and 32 read gaps (16 in each head section). Therefore, magnetic head 27 concurrently reads or writes in 16 different tracks in a respective one of the track groups 0-3.

The magnetic head 27 servo gaps are arranged into three sets, A, B and C, respectively for scanning servo track areas 42-40. Each head section F and H has two servo gaps in each of the sets A-C. The servo gaps are respectively identified by a three digit code, a first digit (F or H) indicates the head section, a second digit (A-C) indicates which of the three sets has the identified servo gap and a third digit (1 or 2) indicates which of the two servo gaps in the respective head section is identified.

Figure 6:
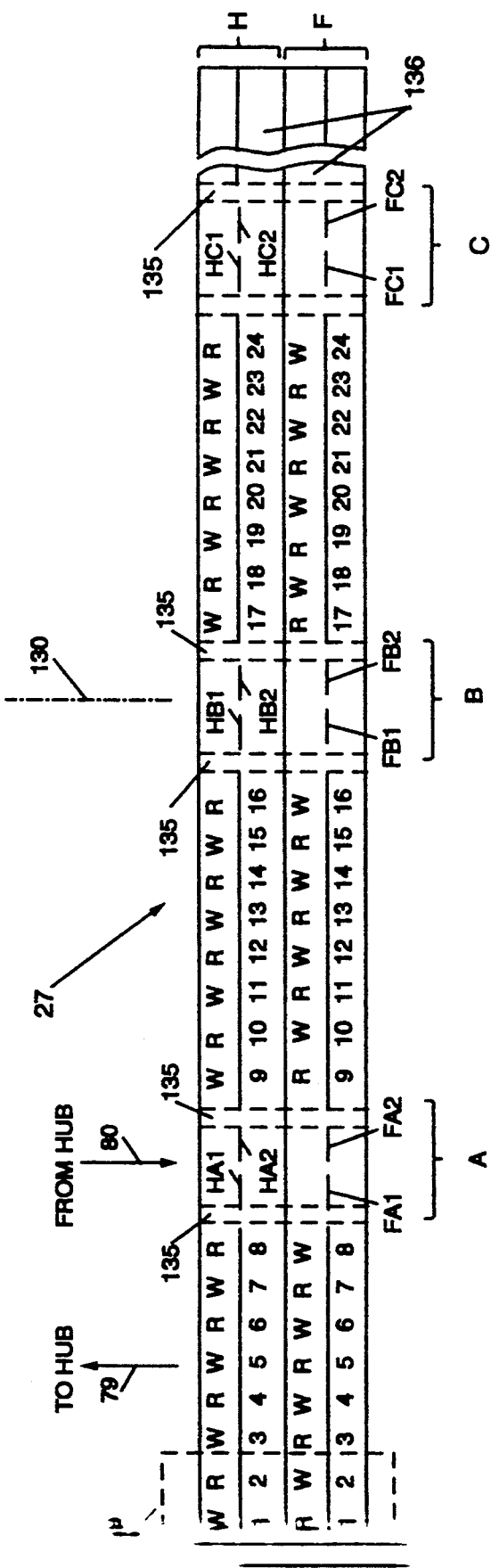
FIG. 6 is a schematic showing of a head gap arrangement for used with the FIG. 3 illustrated servo positioning.

The data gaps (W and R) are arranged in four head lateral areas corresponding to the data track areas 45-48 as best seen in FIG. 6. The odd numbered write gaps respectively concurrently record in one track of the odd numbered track clusters. That is, gap W1 records data in track cluster 1 (one of the tracks 1-4), gap W3 records in track cluster 3 (one of the tracks 9-13), etc. Similarly, even numbered write gaps record in even numbered track clusters. Head 27 is indexed to one of four positions for writing or reading from the tracks (respectively in track groups 0-3).

Numeral 130 denotes the symmetrical lateral center of head 27 gap arrangement. Numeral 135 collectively indicates gap spacing for generating guard bands 91. Numeral 136 indicates gaps numbered 25-32 but not shown in FIG. 6.

Returning now to FIG. 5, the four head 27 index positions respectively labelled "Track Group 0" through "Track Group 3" are described, one indexed head position for accessing tracks in each of the four track groups 0-3, respectively. Servo gaps in gap set A illustrate the four-index positions. Since servo gaps HA1 and HA2 are used to position in scanning direction 79 and servo gaps FA1 and FA2 are identically used in scanning direction 80. The four head 27 index positions and two directions of relative head-to-tape motion, results in using each of the servo gaps twice as set forth below in Table I.

TABLE I

| Track Group | Servo gap usage | | Servo Track |
|---|---|---|---|
| | Direction 79 | Direction 80 | |
| 0 | HA2 | FA2 | 115L |
| 1 | HA1 | FA1 | 115U |
| 2 | HA1 | FA1 | 115L |
| 3 | HA2 | FA2 | 115U |

Head indexing (not described in detail) uses electronic circuits of known design to initially position head 27 in one of the four servo positions. The centered servo gap senses the servo pattern to enable automatically switching from the open loop indexing to servo track following, all as known.

Figure 7:
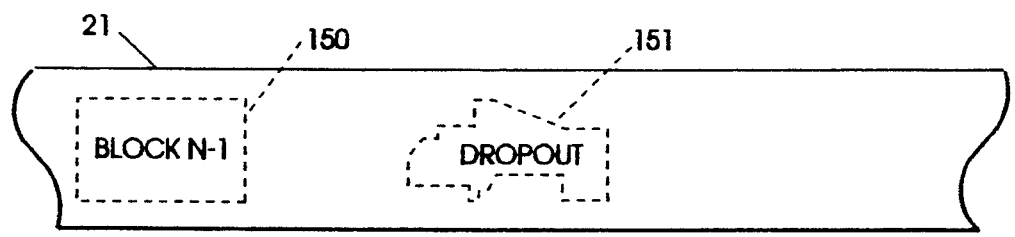
FIGS. 7-12 diagrammatically illustrate practicing media defect avoidance of the present invention on a magnetic tape.
Figure 8:
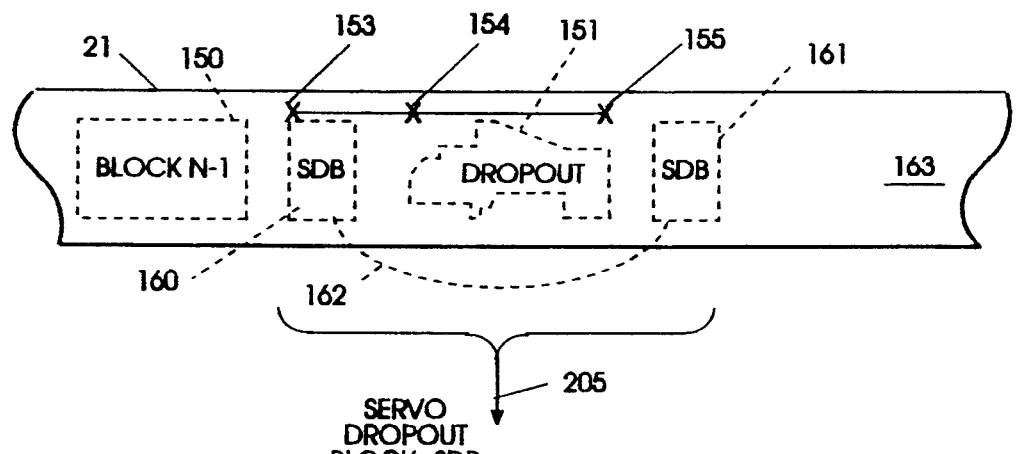
Figure 15:
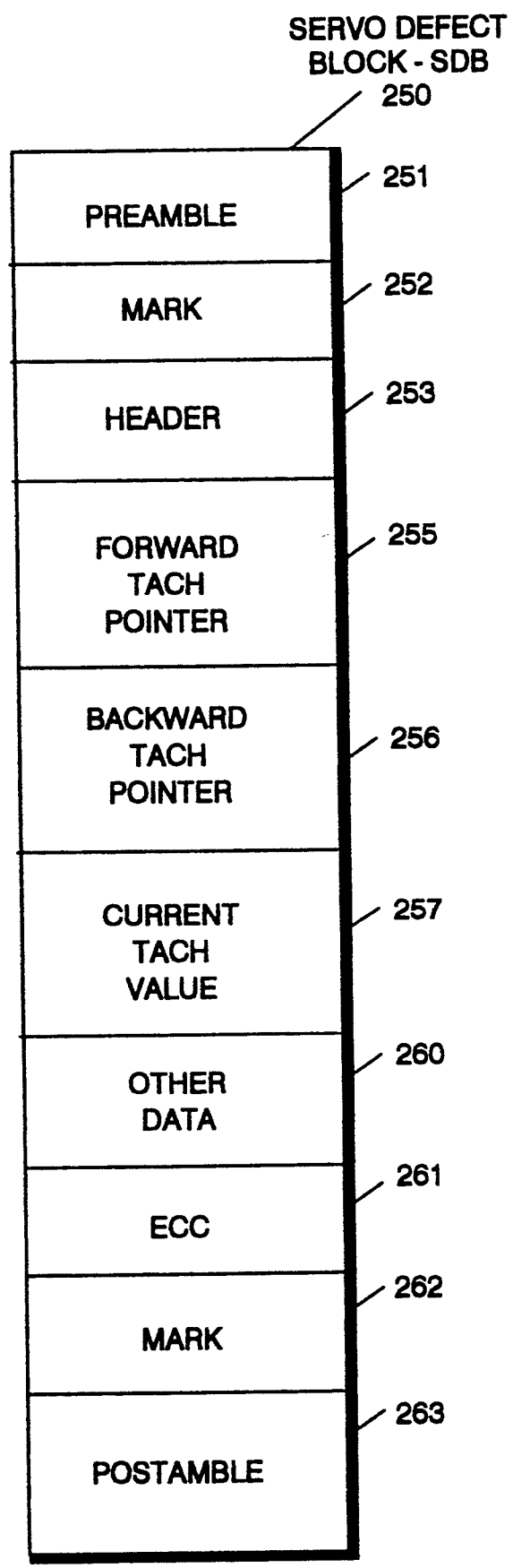
FIG. 15 diagrammatically illustrates a servo defect block (SDB) recorded on the FIG. 2 illustrated magnetic tape for effecting media defect avoidance.
Figure 16:
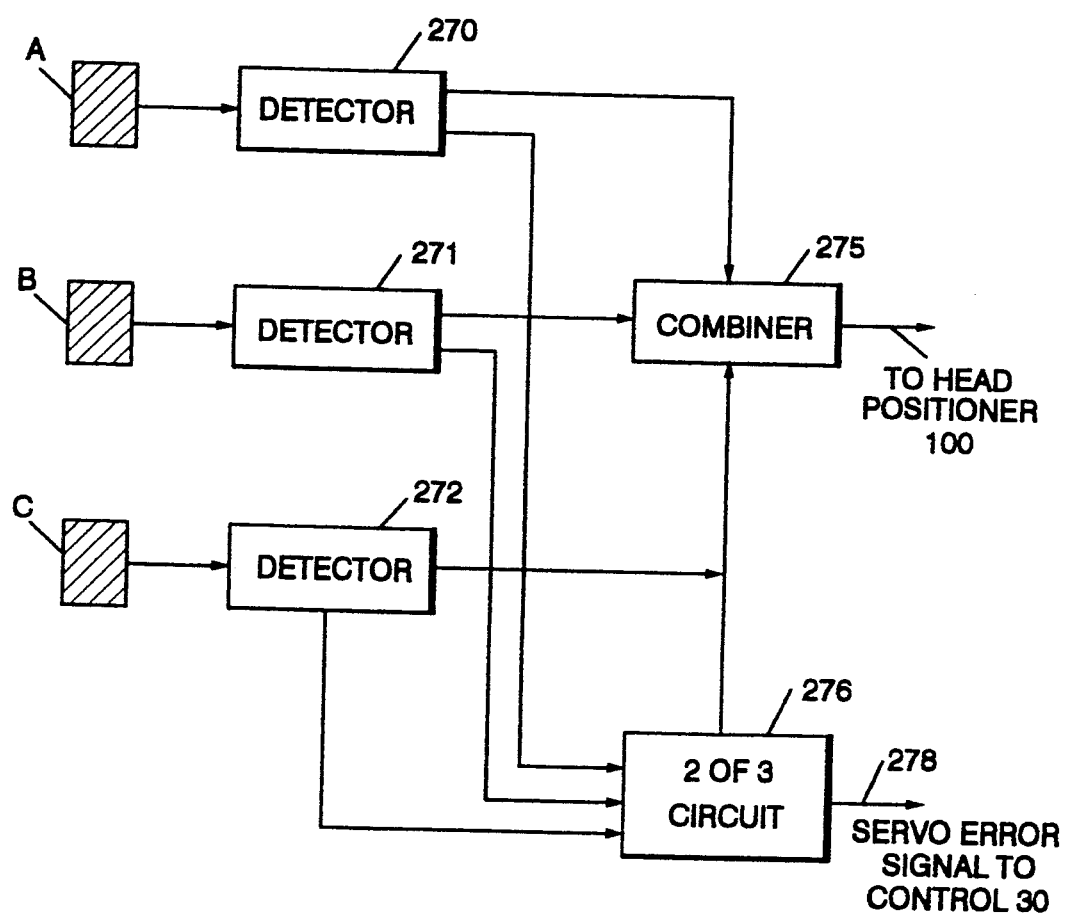
FIG. 16 is a simplified showing of detection and indication of a media defect affecting servo control that identifies a media defect to be avoided using the FIG. 15 illustrated SDB.

FIGS. 7 and 8 illustrate detecting a media defect causing servo signal drop out and avoiding the effects of such media defect using the FIG. 15 illustrated servo defect block SDB. A circuit for detecting a servo defect is shown in FIG. 16. Data block N (not shown—N is a positive integer) is to be next written to tape immediately after existing data block N−1 150 in track group 3 (track groups 0-2 have already been filled). Dropout or defect area 151 extends laterally so as to negatively impact two of the three servo track areas 40-42. As data block N 8 is being recorded, the FIG. 16 illustrated circuits detect that two of the three servo signals are in error. A rule for recording is that at least two of the three servo track areas are valid, otherwise a servo error is indicated. This rule preserves servo redundancy during writing data on tape 21. Upon detecting a servo error, writing data block N is immediately aborted. As described later with respect to FIG. 13, the relative tape 21 to head 27 motion is not stopped until both extremities of dropout 151 are determined. Numeral 153 indicates the beginning of attempted recording of block N (not shown). The longitudinal 18 extremities of dropout 151 are defined at longitudinal points 154 and 155 on tape 21. Even though dropout 151 may affect all future writing and reading operations in all track groups 0–3, the demarking of the servo dropout 151 will be written, at this time, only in track group 3. Then, tape 21 and head 27 are relatively moved to be positioned adjacent data block 150 facing dropout 151. Control 30 then creates a later described servo dropout block (SDB) 160 and writes it to tape 21 beginning at tape longitudinal position 153, as shown. Since the good recording area between data block 150 and drop out 151 accepts SDB 160, tape 21 and head 27 are relatively moved to record a second SDB 161 just beyond dropout extremity 155. Dashed line 162 indicates that SDB's 160 and 161 include pointers indicating the position of the SDB pointed to, i.e. SDB 160 points to SDB 161 and vice versa. Then block N (not shown) is recorded in area 163 of tape 21 to be separated from SDB 161 by a suitable interblock gap (not shown). The written blocks 150, SDB's 160–161 and data block N at area 163 are all in track group 3.

Figure 9:
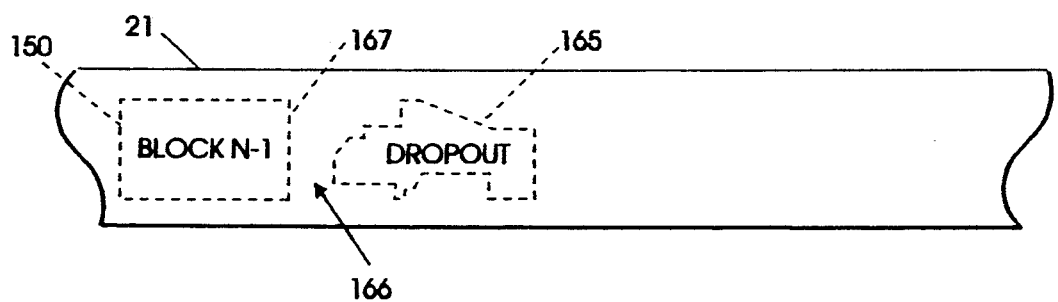
Figure 10:
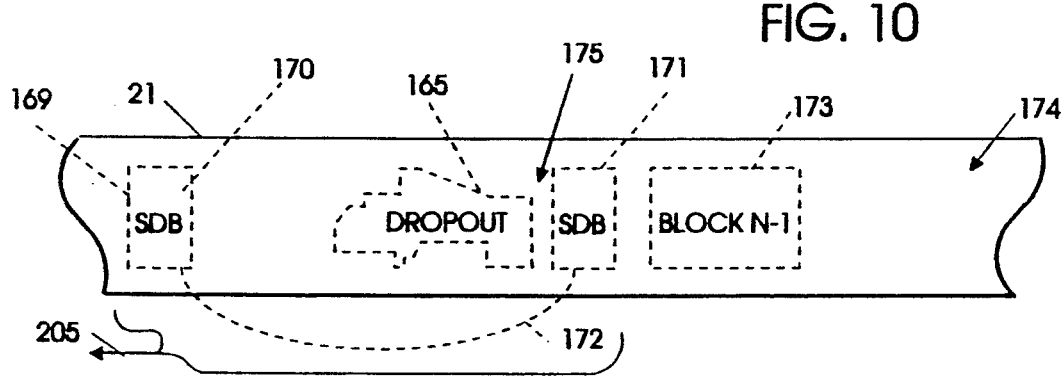

FIGS. 9 and 10 show demarking a servo defect 165 that is sufficiently close to block N−1 150 such that an SDB cannot be written in area 166 between block 150 and dropout. 165. The longitudinal extent of dropout 165 is measured as shown in FIG. 8. The longitudinal tape distance between a trailing end 167 of data block N−1 150 and dropout 165 can be determined in one of two ways. First, a physical location of trailing end 167 and the physical location of leading location of dropout 165 can be subtracted for measuring the longitudinal extent of area 166. If the measurement indicates an insufficient longitudinal extent then the below-described procedure is used. Second, an SDB can be created and attempted to be written as shown in FIG. 8. If the SDB writing encroaches on dropout 165, then the writing is aborted indicating an insufficient longitudinal extent in area 166 for any SDB.

After either of the above-described procedures indicate insufficient space, then tape 21 and head 27 are relatively positioned to read data block N−1 159. The contents of data block N−1 159 are temporally stored in RAM 29 of tape drive 10. SDB 170 is then written over the data block N−1 copy on tape 21 as seen in FIG. 10. The leading edge 169 of SDB 170 begins at the same location that data block N−1 began. This positioning preserves an expected IBG between a data block N−2 (not shown) that was longitudinally adjacent to overwritten data block N−1. Then tape 21 and head 27 are relatively repositioned to be near trailing end 175 of dropout 165. Then tape drive 10 writes SDB 171 on tape 21 as seen in FIG. 10. Data block N−1 stored in RAM 29 is then written to tape 21 at 173 (FIG. 10) separated from SDB 171 by a usual IBG. The SDB's 170 and 171 have the double-linking pointers 172 as described for SDB's 160–161. Data block N is then written to tape 21 in area 174 after data block N−1 173 was written. Usual recording operations then ensue. All of the blocks 167, 170, 171 and 173 are in track group 3 while defect 165 may affect not only the servo track areas 40–41 but all of the track groups 0–3.

Figure 11:
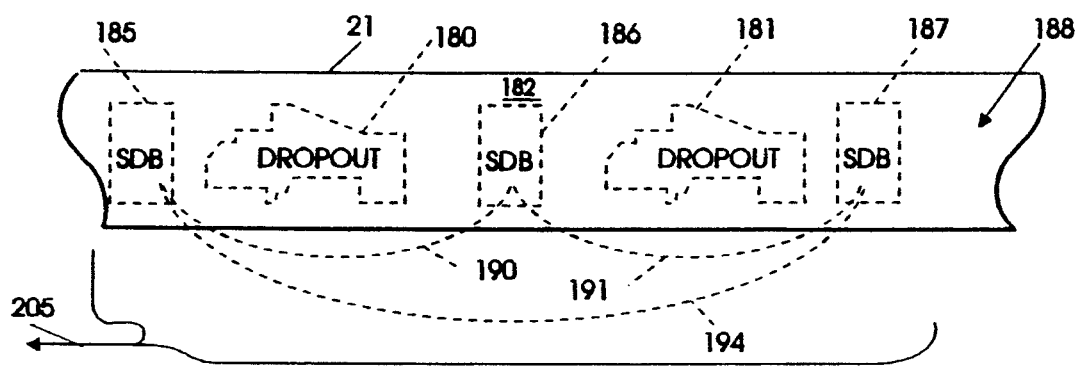

FIG. 11 illustrates demarking two dropouts 180 and 181 that do not permit writing a data block therebetween. SDB's 185 and 187 are written at the extremities of the multiple defect area consisting of dropouts 180–181. In a first instance a longitudinal space 182 exists between dropouts 180–181 having a sufficient longitudinal extent for receiving SDB 186. SDB 186 ensures that no data will be written between the defects in track group 3. In this first instance, SDB 185 and SDB 186 are doubly-linked 190 and SDB 186 and SDB 187 are also doubly-linked 191 for creating a chain of SDB's defining the entire longitudinal extent of the dropouts 180–181. In the instance that area 182 cannot receive and store an SDB, then SDB 185 and SDB 187 are doubly-linked 194 to identify the entire defect area.

Figure 12:
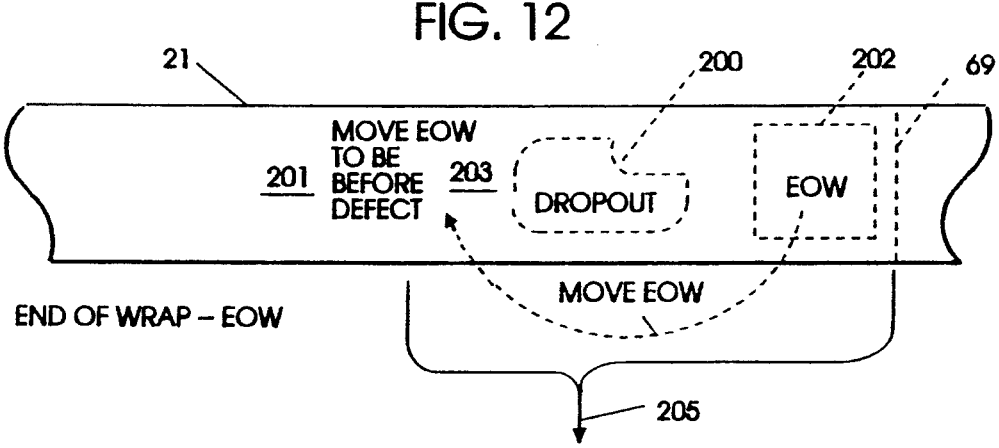

FIG. 12 illustrates demarking servo dropout 200 that is so close to end of wrap 69 indicating block EOW 202 that no SDB can be written between dropout 200 and EOW 202. In this instance, EOW 202 that indicates end of wrap only for track group 3, is moved to area 203 between area 201 that stores written data blocks (not shown) and dropout 200. EOW 202 not only indicates that further recording in the current direction of scanning the data tracks is prohibited but also the subsequent data writing is to ensue on a different set of tracks and track clusters in a reverse direction of tape motion (the reversed tape motion is still a forward direction of scanning). Shortening the track group 3 wrap length avoids access to dropout 200. All of the other track groups 0–2 may then be physically longer that wrap group 3. EOW 202 can be located at either the hub end of tape 21, such as at dashed line 59 or its free end near a so-called load point (not shown). Moving EOW 202 occurs in a same sequence in either event.

In the event there is insufficient room between defect 200 and written data blocks at area 201, then one of the data blocks (not shown) is read into RAM 29, then EOW 202 is written in area 201. The one data block (not shown) is then rewritten to tape in a next track cluster to be scanned. This rewriting procedure is substantially similar to the FIG. 10 illustrated procedure that moves block N−1 to be "downstream" from the defect being identified and bypassed.

From Table I above, it is seen that servo tracks 115U and 115L are used to respective access a separate plurality of track groups 0–3. Therefore, if a defect is found while writing or reading data into or from tracks in any track group that is positioned on servo track 115U, then a same defect problem is predicted for each and every track group that is accessed by positioning to the servo track 115U. Such defect being recorded in DBM 63 is made to refer to all such track groups. Then, while writing data to any such track group sharing servo track 115U, the defect is predicted, writing stopped just before scanning into the defect and SDB block(s) are written as above described. Then writing continues beyond the predicted defect. Even if the predicted defect happened to have a greater longitudinal extent than predicted, the appropriate above-described procedures can be then used. The above-described actions and procedures are indicated in FIGS. 8, 10, 11 and 12 by bracket and arrow 205.

Figure 13:
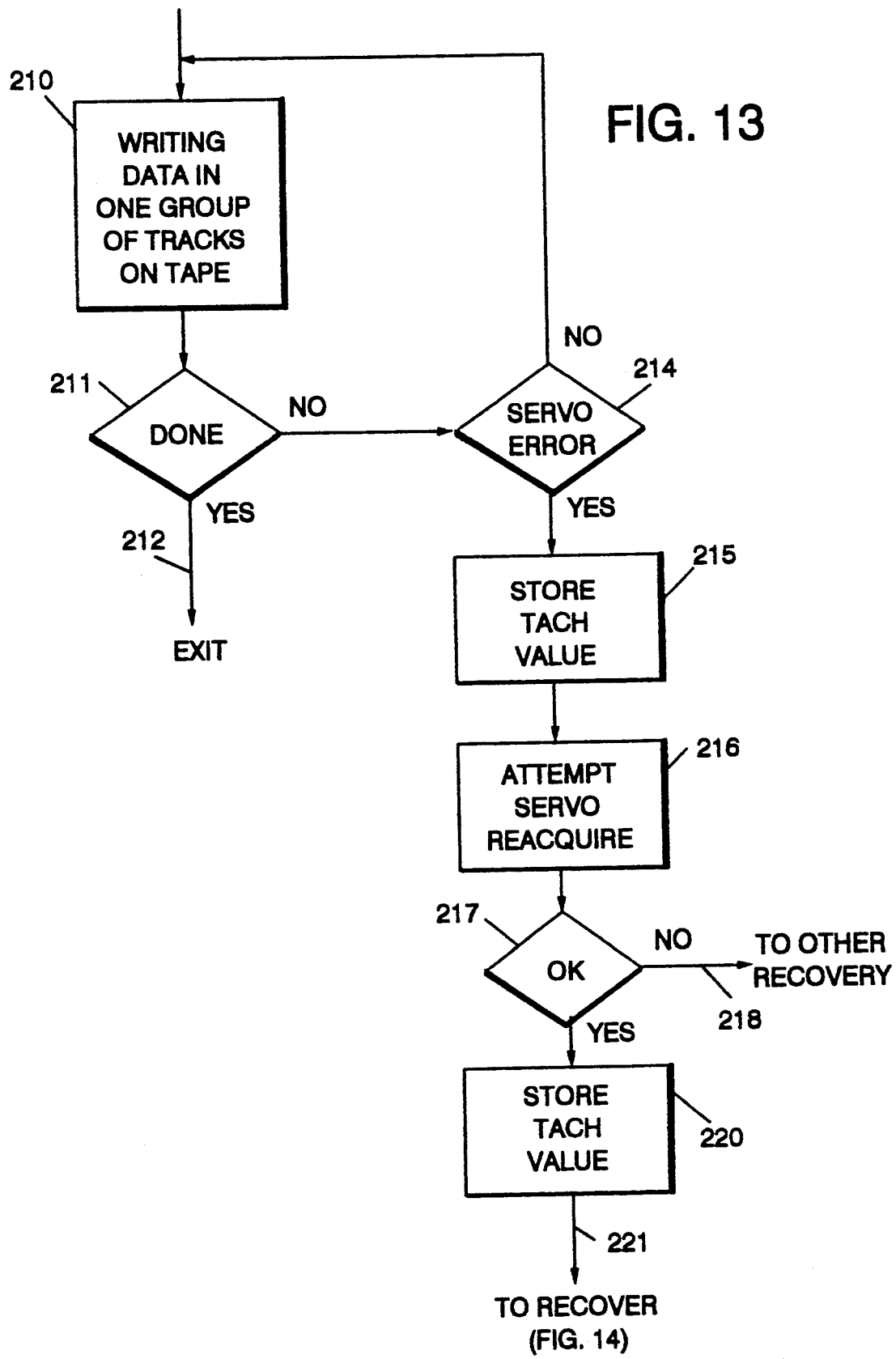
FIGS. 13 and 14 illustrate machine operations for effecting the defect avoidance illustrated in FIGS. 7-12.
Figure 14:
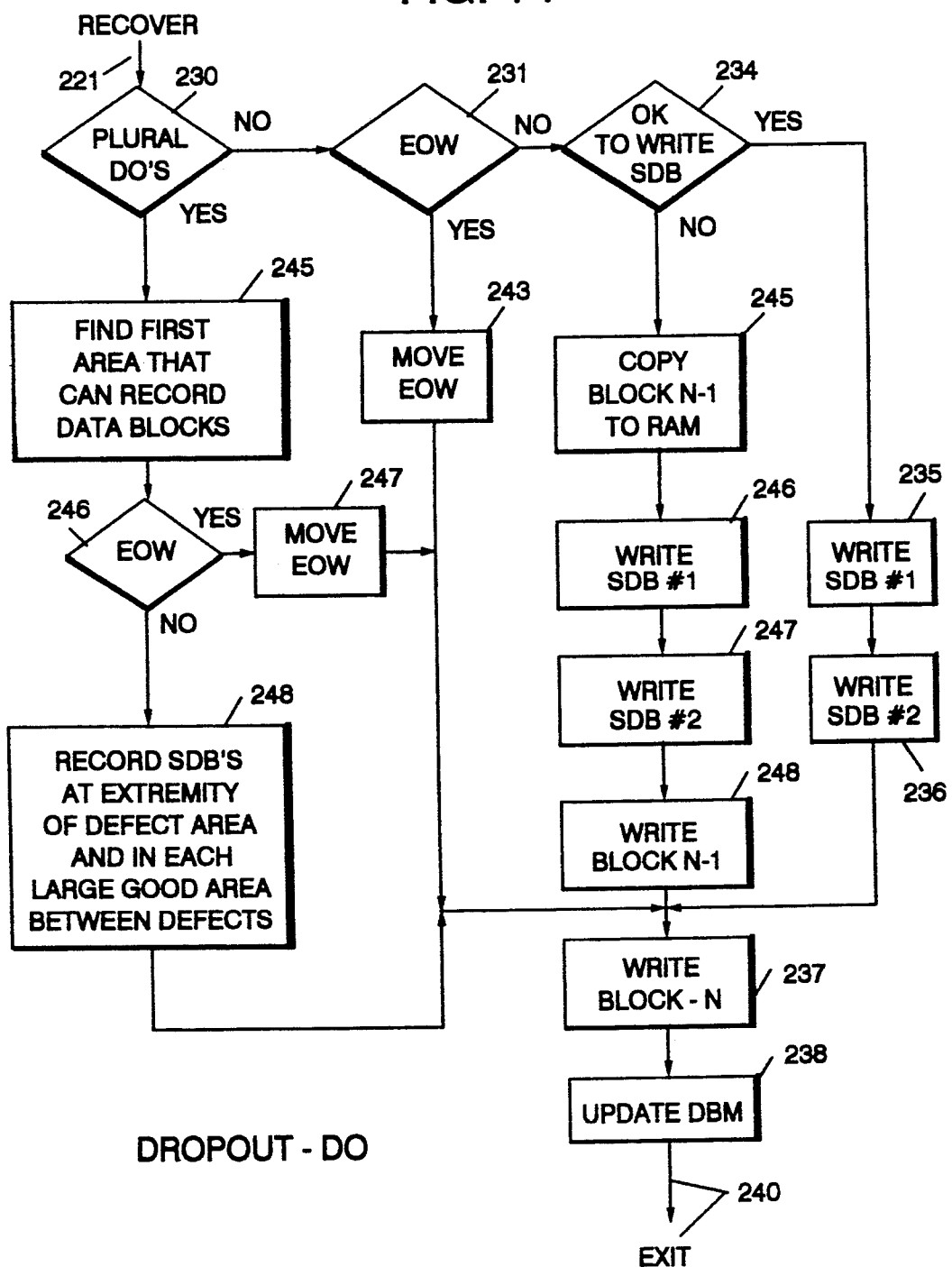

FIGS. 13 and 14 respectively illustrate instituting and completing demarking the servo defect or dropout shown in FIGS. 7–12. FIG. 14 is an abbreviated showing of an error recovery procedure. This procedure is preferably used only during a writing to tape operation. If a servo dropout is detected during a read data from tape operation, then usual read error recovery procedures are preferred to be used. These procedures include open-loop guiding tape 21 through the dropout or defect areas, the relying on error correction procedures for recovering the data from the tape. Of course, tape drive writes an indication of the dropout in a statistical analysis recording system SARS area 69 for both a read or a write operation that detected a servo drop Out. SARS 69, a known error control system, is not only an error log, but also provides a statistical base for facilitating analysis for managing peripheral data storage systems.

At step 210 usual writing to tape operations are being performed. Step 211 determines whether or not the write has been completed, if yes the writing operation is exited at exit 212. If writing is not done (in the middle of writing a data block or another data block is to be written to tape), then step 214 examines whether a servo error has been signalled by the FIG. 16 illustrated circuits. If no servo error is signalled, then writing continues. If a servo error has been signalled (i.e. writing is to be interrupted), then a tachometer (tach) count generated as shown in Milligan et al U.S. Pat. No. 4,393,445, is recorded into a register (not shown) in RAM 29. The relative motion of tape 21 and head 27 continues through the dropout area for identifying a trailing end thereof by attempting servo reacquire a valid servo signal. Step 217 continually checks for a valid servo signal (signals from two of the three servo track areas 40-42 are valid). If no valid servo signal appears before the end of the wrap, then at 218 either the EOW block from the wrap is moved to be ahead of the detected servo dropout (Fig 12) or other recovery procedures beyond the present description may be invoked. Usually the end of the dropout is detected leading to step 220 for storing in RAM 20 the tachometer value identifying such end of servo dropout(s). Then machine operations proceed over path 221 to the FIG. 14 illustrated servo error recovery procedures.

Step 230 of FIG. 14 verifies that either one or more dropouts are to be handled. Note that plural close dropouts may require multiple passes of the FIG. 13 illustrated procedures. In any event, if only one dropout area is identified by two stored tach counts or by one tach count and an EOW indication, then step 231 determines whether or not the defect is immediately adjacent EOW. If not, then step 234 determines whether an SDB 160 can be written between a last previously recorded data block 150. If yes, then steps 235 and 236 respectively record SDB 160 and 161 (FIG. 8), respectively. Then, step 237 writes block N, as in area 163. Step 238 then updates SARS 1 69, DBM 1 65 and all duplicate copies 74 thereof. Tape drive 10 exits the recover at 240.

If step 231 finds the FIG. 12 illustrated defect 200, then step 243 moves EOW 202 to area 203. Then step 237 writes block N (not shown) in a next wrap to be scanned. That is, the tape relative motion to head 27 is reversed from arrow 79 (FIG. 3) to arrow 80. Step 238 is then executed.

If step 230 detects plural close defects 180 and 181, then step 245 finds the first area of tape 21 that can received data blocks, such as area 188 of FIG. 11. If step 246 finds EOW before finding a suitable recording area, then step 247 moves the EOW to be just in front of all of the defects, such as to replace SDB 185 of FIG. 11. If a suitable recording area is found within the track group wrap being scanned, then step 248 records SDBs 185 and 187 to denote the extremities of the multiple defect area caused by dropouts 180 and 181 (FIG. 11). Further, step 248 records an intermediate SDB 186 in each good area between longitudinally adjacent dropouts that cannot receive a data block plus two SDBs. Then steps 237 and 238 are performed.

FIG. 15 is a diagrammatic representation of an SDB 250. Each SDB is created in a same format as the data blocks N, N−1 etc. Preamble 251 and mark 252 provide for read clock (not shown) sync to data byte boundaries. Header 253 identifies the SDB as a servo defect block, i.e. a tape control mark. Forward tach pointer field 255 points to a next SDB in the forward direction of relative tape motion. Therefore field 255 is null in a last or trailing SDB, such as SDB 161 (FIG. 8) while defect leading SDB 160 stores the second tach count or value (defect ending indication) stored by step 220 (FIG. 13) in RAM 29. Backward tach pointer field 256 is null in defect leading SDB 160 (pointing to a tape backward direction) while the SDB 161 backward tach pointer field contains the first tach value captured in step 215 for recording into RAM 29. All intermediate SDB's, such as SDB 186 (FIG. 11) store the first or backward tach value in field 256 and the second or forward tach value in field for respectively pointing to SDBs 185 and 187. Field 257 may store a tach value for the SDB 250. Field 260 may contain other data, such as which of the track groups 0-3 have an identical SDB arrangement, etc. An ECC redundancy in field 261 enables detection and correction of data errors in fields 253–261. Mark 262 denotes the end of the data area (fields 253–261) and onset of postamble 263. If all reading is in a forward direction, then field 263 may be dispensed with.

Therefore, it is seen that each defect leading SDB 160 indicates an end of data for a limited portion of tape 21. Defect trailing SDB 161 indicates an end of the limited portion and an onset of a data recording area of tape 21. Also, EOW 202 block, constructed as shown in FIG. 15 excepting that no forward or backward pointers are provided, header 253 indicates the block is an end of wrap indicating block. End of data blocks 78 (FIG. 2) are similarly constructed wherein header 253 indicates end of data while data pertinent to such end of data may be included in EOD 78.

FIG. 16 is a simplified diagrammatic showing of detecting a servo defect. An active servo gap from each of the servo gap sets A, B and C respectively supply sensed servo signals to detectors 270-272. Detectors 270-272 not only detect servo position as described for FIG. 5, but also detect servo error conditions. These error conditions include low quality or no servo signal being received, the amplitude of F1 servo signal is too large (not properly following the servo track 1 or 2), the amplitude differential between the F1 and F2 signals may be excessive (off track indication), unexpected signals may be sensed in null areas 109, and the like.

While the invention has been particularly shown and described with reference to preferred embodiments thereof, it will be understood by those skilled in the art that various changes in form and details may be made therein without departing from the spirit and scope of the invention.

What is claimed is:

1. A method of recording data onto a record member in a predetermined number of elongated parallel longitudinally-extending data tracks using a recording/reading head means, including the steps:

intermittently relatively moving longitudinally said head means and said record member for causing said head means to longitudinally scan predetermined ones of said data tracks;

while said head means is longitudinally scanning said predetermined ones of said data tracks, recording data in a plurality of addressable blocks of said data in said predetermined ones of said data tracks;

indicating that a change in said recording is to occur in limited longitudinal portion of all of said predetermined ones of data tracks:

aborting said recording;

indicating first and second longitudinal data track locations along each of said predetermined ones of said data tracks as first and second longitudinal track locations or defining said limited longitudinal portion;

relatively moving longitudinally said record member and head means to said first longitudinal data track location;

recording into all of said predetermined ones of said data tracks at said first longitudinal data track location a first control mark for identifying, by said longitudinal location of the first control mark in said data tracks, an onset of said limited longitudinal portion, and inserting into said first control mark an indication of said second longitudinal rack location;

then continuing recording data unto said predetermined ones of said data tracks outside of said limited longitudinal portion:

after recording said first control mark at said first longitudinal data track location in said predetermined ones of said data tracks, relatively moving longitudinally said record member and said head means to said second longitudinal data track location;

recording unto said predetermined ones of said data tracks at said second longitudinal track location a second control mark for indicating an end of said limited longitudinal and inserting into said second control mark an indication of said first longitudinal track location;

providing said record member with machine-sensible servo indications disposed in a longitudinally-extending servo track on said record medium that is parallel to and laterally separate from all of said longitudinal extending data tracks for indicating a relative position of said record member and said head means laterally of said predetermined number of said data tracks; while recording said data in said data tracks, sensing said servo indications for servoing the head means and record member laterally of said data tracks to said indicated relative position;

while recording said data in said predetermined ones of said data tracks, sensing said servo indications for detecting and indicating that a predetermined lateral position servo error has occurred;

responding to said indicated position servo error to perform said indicating and aborting steps including in said indicating step:

generating said indication of said first longitudinal track location;

continuing relatively moving longitudinally said head means and record member for detecting cessation of said predetermined servo error; and responding to said cessation of said predetermined servo error to generate said indication of said second longitudinal track location;

whereby said limited longitudinal portion is laterally aligned with said predetermined servo error.

2. The method set forth in claim 1, the steps of:

selecting said record member to be an elongated magnetic tape supporting said predetermined number of elongated data tracks and said servo indications along the length of the magnetic tape;

dividing said predetermined number of data tracks into a plurality of concurrent access track groups, providing two subgroups of said data tracks in each said track groups, in each track group, scanning said head means over a first subgroup of tracks in a first direction of tape motion relative to said head means as a forward direction and scanning said head means over a second of said sub-groups of tracks in a second direction opposite to said first direction of tape motion as said forward direction;

selecting said data tracks in one of said sub-groups to be said predetermined ones of said data tracks interleaving said data tracks from each said track groups with data tracks from other ones of said track groups such that said data tracks in each said track groups are laterally separated by a track from another one of said track groups;

recording data in said predetermined ones of said data tracks only while scanning said predetermined ones of said data tracks in said forward direction;

dividing said servo indications in said servo track into three laterally evenly spaced-apart servo track areas, each said servo track area extending longitudinally along said magnetic tape;

while writing data into said data tracks in any of said track groups, sensing all of said servo indications in all of said servo track areas; and while scanning said first predetermined ones of said data tracks for recording data into data tracks therein detecting that scanning any one of said servo track areas results in said predetermined servo signal for indicating said servo error.

3. The method set forth in claim 2, including the steps of:

during each one of said longitudinal relative motions of the record member and said head means, measuring and indicating a current relative longitudinal location of said record member with respect to said head means;

recording said data onto said elongated tape in addressable data blocks separated by inter-block gaps, respectively;

upon said aborting said recording, capturing a first of said current relative longitudinal location indications as said first location indication;

upon detecting said cessation, capturing a second one of said current longitudinal location indications as said second location indication; and creating and recording said first and second control marks as addressable data blocks, inserting into each of said first and second control marks a copy of said first and second longitudinal location indications respectively in said second and first control marks for doubly-linking said first and second control marks.

4. The method set forth in claim 3, the steps of:

detecting and indicating a plurality of said servo errors in a predetermined longitudinal portion of said servo indications wherein some of the detected servo errors are separated a predetermined longitudinal extent of said servo indication that is insufficient for recording one of said addressable data block in said first predetermined ones of said data tracks;

detecting and indicating said longitudinal locations along said magnetic tape of said plurality of servo errors and indicating said plurality of servo errors as beginning at said first longitudinal data track location and ending at said second longitudinal data track location and indicating said predetermined length of said data tracks by third and fourth longitudinal data track location indications for said longitudinal data track locations disposed intermediate said first and second longitudinal data track locations; and recording a third tape control mark in said predetermined length of sad data tracks in said first track group, recording in said third tape control mark said first and second longitudinal data track location indications, recording in said first tape control mark said third longitudinal data track location indication and recording in said second tape control mark said fourth longitduinal data track location such that said first through third tape control marks are doubly-linked together.

5. In the method set forth in claim 3, the steps of:

recording an end-of-tape tape control mark at each longitudinal end of said data tracks in each of said track subgroups, respectively;

detecting said servo error at one longitudinal end of said data tracks in a first one of said track subgroups; and moving said end-of-tape tape control mark to be longitudinally between said detected servo error and data recorded on said data tracks whereby neither said first nor second control marks are recorded on the magnetic tape for avoiding the detected servo error at said longitudinal end of data tracks in said first one of said track sub-groups.

6. Apparatus for recording data signals onto a elongated magnetic tape record medium said record medium having a predetermined number of laterally spaced-apart longitudinally-extending data tracks that are accessible by a recording/reading head means said record medium and said head means being relatively movable longitudinally of said record member for accessing any area of Said data tracks on said record member, including, in combination:

recording means having said head means for recording data in and reading data from said data tracks in a plurality of addressable blocks of said data;

format means connected to the recording means for indicating that a change in said recording is to occur in a limited longitudinally extending portion of all said data tracks;

said format means actuating said recording means to abort said recording;

said format means having tape location means for indicating first and second longitudinal data track locations for defining and indicating a predetermined longitudinal extent of said limited longitudinal portion:

said recording means having moving means for relatively moving longitudinally said record member and head means to said first longitudinal data track location;

said recording means responding to said moving means for recording unto said data tracks at said first longitudinal data track location a first tape control mark for identifying by its longitudinally recorded location in said data tracks said limited longitudinal portion and inserting into said first control mark an indication of said second longitudinal track location:.

said recording means continuing recording data unto said data tracks outside of said limited longitudinal portion;

said recording means being responsive to recording said first control mark to relatively move said record member head means to said second longitudinal data track location;

said recording means responding to said move to said second longitudinal data track location for recording unto said data tracks at said second longitudinal data track location a second tape control mark for indicating by the longitudinal position in said data tracks of said second tape control mark an end of said limited longitudinal portion at said second longitudinal data track location and inserting into said second tape control mark an indication of said first longitudinal track location;

said record member having longitudinal-extending machine-sensible servo indications that indicate a relative position of said record member and said head means laterally of said data tracks, said data tracks and said servo indications being parallel along the length of the magnetic tape;

said recording means having servo means for sensing said servo indications to servo the head means and record member laterally to a length of said data tracks for laterally centering the head means on predetermined ones of said data tracks to said indicated relative position;

servo error means in said servo means for detecting and that a predetermined servo error has occurred;

recovery means in said recording means having first means for responding to said indicated servo error for aborting said recording and generating said indication of said first longitudinal track location;

said recovery means having continue means for continuing relatively moving longitudinally said head means and said magnetic tape for detecting cessation of said predetermined servo error; and said recovery means having second means for responding to said continue means detecting and indicating cessation of said predetermined servo error to generate said indication of said second longitudinal data track location;

whereby said limited longitudinal portion is laterally aligned with said predetermined servo error.

7. The apparatus set forth in claim 6, the combination of:

said record medium having a plurality of concurrent access track groups with each said track group having a given plurality of said data tracks, each said track group having first and second subgroups of said data tracks;

said head means having means for scanning longitudinally each said first sub-group of data tracks in a first direction of relative tape motion as a forward direction and scanning longitudinally a second of said sub-groups of tracks in a second direction opposite to said first direction of tape motion as said forward direction;

said data tracks in each of said track groups being interleaved with said data tracks from said track groups such that said data tracks in each said track group are separated by a plurality of data tracks respectively from other ones of said track groups such that one data track from each of said other track groups is disposed laterally between said data tracks in said each track group;

said head means recording data in data tracks only while scanning such data tracks in said forward direction;

said servo indications being in three laterally evenly spaced-apart longitudinally-extending servo track areas;

said servo means, while said head means is recording data into any of said track groups, simultaneously sensing said servo indications in all of said servo track areas; and said error means detecting that while scanning longitudinally all of said servo track areas that any one of said servo track areas results in a predetermined servo signal and responding to said detection of one predetermined servo signal for indicating said servo error.

8. Apparatus set forth in claim 7, including, in combination:

tape location means for sensing and indicating any relative longitudinal motion of the record member and said head means to measure and indicate a current relative longitudinal location of said record member with respect to said head means;

said head means recording said data onto said record member in addressable ones of said data blocks separated by inter-block gaps;

said error means upon aborting said recording, capturing a first of said current relative longitudinal location indications as said first longitudinal data track location;

said error means responding to said cessation of recording for capturing a second current longitudinal location indication as said second longitudinal data track location; and said recording means having tape control block means for creating and recording through said head means said first and second tape control marks as addressable tape-control data blocks and for inserting into each of said first and second created tape control marks a copy of said first and second longitudinal data track locations respectively in said second and first tape control marks for doubly-linking said first and second tape control marks.

9. The apparatus set forth in claim 8, further including, in combination:

said error means for further detecting and indicating a plurality of said servo errors in a predetermined portion of said data tracks wherein some of the detected servo errors are separated a predetermined length of said data tracks that is insufficient for recording a said addressable tape-control data block;

said error means connected said tape location means for detecting and respectively indicating said longitudinal data track locations of said plurality of servo errors and indicating such plural servo errors as a beginning at said first longitudinal data track location and ending at said second longitudinal data track location and indicating said predetermined length of said data tracks by third and fourth longitudinal data track location indications for said longitudinal data track locations disposed intermediate said first and second longitudinal data track locations in said data tracks; and said error means having third means for recording a third tape control mark in said predetermined length of said data tracks in said first track group and for recording in said third tape control mark said first and second longitudinal track location indications, recording in said first tape control mark said third longitudinal data track location indication and recording in said second tape control mark said fourth longitudinal data track location such that said first through third tape control marks are doubly-linked together.

10. The apparatus set forth in claim 7, further including, in combination:

said recording means having data-track longitudinal end means for recording a longitudinal-end-of-track tape control mark at each longitudinal end of said data tracks in each of said track sub-groups;

said error means detecting said servo error at one of said longitudinal end of said data tracks in said first track group; and said recovery means moving longitudinally said longitudinal-end-of-track tape control mark to be longitudinally disposed in said data tracks of said first track group between said detected servo error and data recorded on said data tracks in said first track group.

11. Apparatus set forth in claim 6, further including, in combination:

said format means generating an indication of said limited longitudinal portion including indicating a longitudinal data track location of said limited longitudinal portion and actuating said recording means to record via said head means said indication in a predetermined addressable longitudinal data track location on said record medium;

said record means having a plurality of track groups of said data tracks, each said track group having a like number of said data tracks, said like number being an integral sub-multiple of said predetermined number, all said data tracks in each respective track group being independently accessible from data tracks in separate ones of said groups;

said predetermined addressable longitudinal data track location being in one of said track groups at a longitudinal data track position laterally aligned to indicate a longitudinal data track location where said change in said recording is to occur in one of said track groups;

lateral position indicating servo signals on the record medium that extend substantially the longitudinal extent of the record medium, said servo signals being arranged in a plurality of servo indicating tracks;

servo means being connected to said head means for sensing said servo signals for laterally relatively positioning said head means and said record medium to enable said head means to scan any one of said track groups for respectively accessing said data tracks in the respective track group;

said head means having a plurality of laterally displaced servo heads, each head for scanning any one of said servo tracks such that a maximum number of said track groups is a product of said plurality of said servo heads and said servo tracks whereby a plurality, equal to the plurality of said servo heads, of said track groups are accessible by scanning any one of said servo tracks by respective ones of said servo heads; and said format means having prediction means responding to said indication and to said head means scanning a predetermined one of said servo tracks for indicating said limited longitudinal portion as being in all of said track groups that are accessible by respective ones of said servo heads scanning said predetermined one of the servo tracks even though said first control mark is recorded only in one of said track groups.

12. Apparatus set forth in claim 11, further including, in combination;

error detection means in said format means for detecting and indicating a predetermined servo positioning error in said predetermined one of said servo tracks;

said format means responding to said error detection means indicating said predetermined servo position error to create said limited longitudinal portion to longitudinally span in said data tracks a longitudinal extent of said detected and indicated predetermined servo positioning error in said servo tracks such that said limited longitudinal portion is laterally aligned with said detected and indicated predetermined positioning error.

* * * * *